H. WATERS.
Scythe Fagot.
No. 67,005.
Patented July 23, 1867.
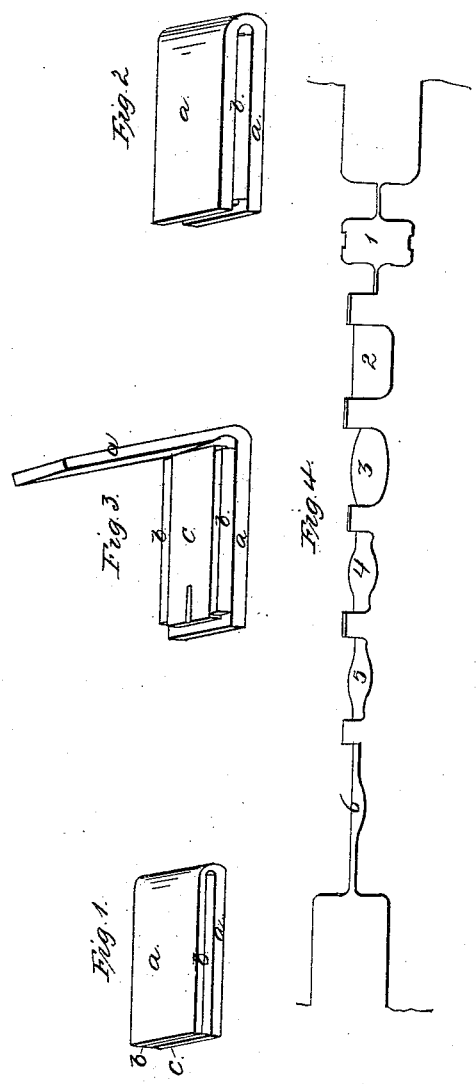

United States Patent Office.

HERVEY WATERS, OF BOSTON, MASSACHUSETTS.

Letters Patent No. 67,005, dated July 23, 1867.

---

IMPROVED FAGOT FOR SCYTHE.

---

*The Schedule referred to in these Letters Patent and making part of the same.*

---

TO ALL WHOM IT MAY CONCERN:

Be it known that I, HERVEY WATERS, of Boston, in the county of Suffolk, and State of Massachusetts, have invented a new and useful Improvement in the Manufacture of Scythes; and I do hereby declare that the following, when taken in connection with the drawings which accompany and form part of this specification, is a description of my invention sufficient to enable those skilled in the art to practise it.

The invention relates to the disposition of iron and steel in a fagot or pile to be welded into bars for scythe-rods; and consists in so arranging the bars constituting the fagot that when welded into a bar said bar shall have the iron and steel for two scythes side by side and in proper relative position.

Figure 1 of the drawings represents the arrangement of iron and steel constituting the fagot as constructed for two scythes, the bar $a$ being plain, and having between its folds three pieces, the two outer ones, $b$, being of fine steel for the edges, and the middle one, $c$, of iron or cheap steel for the backs of the same.

This fagot or pile may be heated and fluxed by any convenient proceeding, so as that the entire piece shall at the same time be properly heated and fluxed in all its parts, for the purpose of being welded throughout by being passed through any suitable rolls for welding and drawing down into a bar from which scythe-rods can be afterwards perfected.

In welding and drawing the pile thus constructed and prepared, I prefer to make the first pass in the rolls "edgewise," in a groove similar to the first pass of the suit of grooves represented in profile at Figure 4, so as to bring the edge-steels to positions below the surface of the edges of the bar of iron, that the edge-steels may not (in rolling down flatwise) get too much upon the outside, which they incline to do.

Figures 2 and 3 represent the fagot as constructed for four scythes, very similar to what is shown in fig. 1, but with variations.

Both of the last two may be welded in substantially the same manner by heating and fluxing throughout and passing through a suit of roller-grooves, as represented in profile at fig. 4, and may be thus drawn and afterwards be made into my improved scythe-rod, patented May 2, 1865, (No. 47,589.)

I claim a fagot or pile having an arrangement of iron and steel for two or more scythes, substantially as described.

HERVEY WATERS.

Witnesses:
 J. B. CROSBY,
 FRANCIS GOULD.